US010932479B2

(12) United States Patent
Aldred et al.

(10) Patent No.: US 10,932,479 B2
(45) Date of Patent: Mar. 2, 2021

(54) PROCESS FOR THE MANUFACTURE OF A FROZEN PRODUCT

(71) Applicant: Conopco, Inc., Englewood Cliffs, NJ (US)

(72) Inventors: Alexander Aldred, Bedford (GB); Rodney David Bee, St. Neots (GB); Victoria Suzanne Elizabeth Evans, Bedford (GB); Magdalena Trycholik-Kinavuidi, Sharnbrook (GB)

(73) Assignee: Conopco, Inc., Englewood Cliffs, NJ (US)

( * ) Notice: Subject to any disclaimer, the term of this patent is extended or adjusted under 35 U.S.C. 154(b) by 262 days.

(21) Appl. No.: 15/778,790

(22) PCT Filed: Nov. 22, 2016

(86) PCT No.: PCT/EP2016/078473
§ 371 (c)(1),
(2) Date: May 24, 2018

(87) PCT Pub. No.: WO2017/093084
PCT Pub. Date: Jun. 8, 2017

(65) Prior Publication Data
US 2018/0352831 A1    Dec. 13, 2018

(30) Foreign Application Priority Data
Nov. 30, 2015    (EP) .................................... 15196934

(51) Int. Cl.
A23G 9/46    (2006.01)
A23G 9/52    (2006.01)
(Continued)

(52) U.S. Cl.
CPC ............... *A23G 9/46* (2013.01); *A23G 9/045* (2013.01); *A23G 9/52* (2013.01); *C01B 21/22* (2013.01); *C01B 32/50* (2017.08)

(58) Field of Classification Search
CPC . A23G 9/46; A23G 9/045; A23G 9/52; C01B 32/50; C01B 21/22; F25C 1/12; F25C 1/14
See application file for complete search history.

(56) References Cited

U.S. PATENT DOCUMENTS 2,575,509 A    11/1951    Bayston
2,975,603 A    3/1961    Barnes et al.
(Continued)

FOREIGN PATENT DOCUMENTS

CA    754327    3/1967
CA    768385    10/1967
(Continued)

OTHER PUBLICATIONS

Search Report and Written Opinion in EP15196934 dated May 11, 2016.
(Continued)

*Primary Examiner* — Joseph F Trpisovsky
(74) *Attorney, Agent, or Firm* — Gerard J. McGowan, Jr.

(57) ABSTRACT

A process for the manufacture of frozen gas hydrates, the process comprising passing a liquid aqueous phase over a heat exchanger surface under an atmosphere of a pressurised water-soluble gas, characterised in that the conditions of the process are selected to ensure that there is simultaneous dissolution of the pressurised gas into the liquid aqueous phase, and the formation of a solidified continuous phase from solidification of the liquid aqueous phase in contact with the heat exchanger surface.

14 Claims, 6 Drawing Sheets

(51) Int. Cl.
*C01B 32/50* (2017.01)
*A23G 9/04* (2006.01)
*C01B 21/22* (2006.01)

(56) References Cited

U.S. PATENT DOCUMENTS

| | | | |
|---|---|---|---|
| 3,217,503 A | 11/1965 | Mitchell et al. | |
| 3,220,204 A * | 11/1965 | Adler | A23G 9/52 |
| | | | 62/70 |
| 3,255,600 A | 6/1966 | Mitchell et al. | |
| 3,333,969 A | 8/1967 | Mitchell et al. | |
| 4,022,119 A | 5/1977 | Karr | |
| 4,347,707 A | 7/1982 | Zemelman et al. | |
| 4,333,315 A | 8/1982 | Zemelman et al. | |
| 4,393,660 A | 7/1983 | Kleiner et al. | |
| 4,398,394 A | 8/1983 | Kleiner et al. | |
| 4,398,395 A | 8/1983 | Hinman et al. | |
| 4,404,807 A | 9/1983 | Zemelman et al. | |
| 4,487,023 A | 11/1984 | Hegadorn et al. | |
| 4,934,153 A | 6/1990 | Ebinuma et al. | |
| 5,231,851 A | 3/1993 | Adolfsson | |
| 2006/0045948 A1 | 3/2006 | Shilling et al. | |
| 2009/0266106 A1 * | 10/2009 | Ogoshi | C09K 5/063 |
| | | | 62/532 |

FOREIGN PATENT DOCUMENTS

| | | |
|---|---|---|
| CA | 827603 | 11/1969 |
| CA | 1225863 | 8/1987 |
| CN | 1757696 | 4/2006 |
| CN | 1962043 | 5/2007 |
| CN | 201093168 | 7/2008 |
| CN | 101254447 | 9/2008 |
| CN | 101415801 | 4/2009 |
| CN | 101568768 | 10/2009 |
| CN | 101818088 | 9/2010 |
| CN | 102798309 | 11/2012 |
| CN | 104413513 | 3/2015 |
| EP | 0965563 | 12/1999 |
| EP | 1328162 B | 6/2011 |
| GB | 1005399 | 9/1965 |
| GB | 1095004 | 12/1967 |
| GB | 1116072 | 6/1968 |
| GB | 1118404 | 7/1968 |
| GB | 2425165 | 10/2006 |
| JP | S5629961 | 3/1981 |
| JP | S6054664 | 3/1985 |
| JP | H06343398 | 12/1994 |
| JP | 2005239782 | 9/2005 |
| JP | 2010248449 | 4/2009 |
| JP | 2012191935 | 10/2012 |
| KR | 20130079766 | 7/2013 |
| WO | WO9618310 | 6/1996 |
| WO | WO97116980 | 5/1997 |
| WO | WO0234065 | 5/2002 |
| WO | WO2010069769 | 6/2010 |
| WO | WO2012045652 | 4/2012 |

OTHER PUBLICATIONS

T.B. Peters et al.; Production of CO2 clathrate hydrate frozen desserts by flash freezing; Journal of Food Engineering; 2010; pp. 669-677; XP027119682; vol. 100, No. 4; Elsevier.

Search Report and Written Opinion in PCTEP2016078473 dated Mar. 15, 2017.

Written Opinion 2 in PCTEP2016078473 dated Dec. 11, 2017.

Chen et al.; Theory and Technology of Exploitation of Natural Gas Hydrates; China University of Petroleum Press; Dec. 31, 2011; pp. 70-78.

Stern et al.; Temperature, pressure, and compositional effects on anomalous or Mself,J preservation of gas hydrates; Can. J. Phys. ; Apr. 4, 2003; pp. 271-284; vol. 81, Issue 1-2.

Office Action and Search Report in CN201680069996.9 dated Dec. 1, 2020, plus English translation.

* cited by examiner

Phase diagram for carbon dioxide / ice clathrate

PROCESS FOR THE MANUFACTURE OF A FROZEN PRODUCT

FIELD OF THE INVENTION

The present invention relates to a process for the manufacture of gas hydrates, the process comprising passing a liquid aqueous phase over a heat exchanger surface, for use in food products.

BACKGROUND OF THE INVENTION

Fizzy particles are desired in many products, including those for children. In the field of frozen confections, gas hydrate crystals trapped within an ice structure can be used to deliver a fizzy sensation to products. A gas hydrate (hydrates are also known as clathrates) is a crystalline solid which consists of gas molecules surrounded by cages of water molecules. It is therefore similar to ice with a gas molecule contained within a cage of water molecules. Gases with a molecular size suitable to form hydrates include carbon dioxide ($CO_2$) and nitrous oxide ($N_2O$). Suitable temperature and pressure conditions for the formation of carbon dioxide or nitrous oxide gas hydrates can be derived from the phase diagrams of the respective gas-aqueous liquid combination, which are available in the literature. Gas hydrates have a stoichiometric formula: for carbon dioxide gas hydrate the theoretical maximum is $CO_2*5.75H_2O$. However, gas hydrate crystals are unstable at atmospheric pressure (even at typical cold store temperatures) so the ice around the hydrate crystals is essential in order to prevent the decomposition of the hydrates during manufacture and storage. The ice acts as a microscopic pressure vessel and on warming (e.g. in the mouth when consumed), the ice layer around the gas hydrate crystals melts, and the gas hydrate decomposes releasing the gas. This provides a "fizzing" sensation similar to that of carbonated drinks.

Carbon dioxide gas hydrates can be produced by passing carbonated water at pressure through a tubular heat exchange under pressure. The carbonated water freezes to the inner surface of the tube as it passes through. As further carbonated water is passed through the tube it freezes on the already formed ice gradually forming a tube of ice that contains gas hydrates. The ice is then removed and broken into particles. When consumed, these particles melt in the mouth, the gas hydrates release the $CO_2$ and provide a fizzy sensation. However there are issues with such techniques. For example the activity of the particles (i.e. the amount of gas contained within them) may decrease along the length of the tube because the water contains less and less $CO_2$ the further along the tube it goes.

There is also an issue with approaches in which gas is injected into the mix. This is again due to the fact that the gas is utilised at the point of injection and the mix suffers a concentration reduction in the gas the further away from the point of injection it is. Such techniques disclosed in the prior art are as follows.

CA1225863 (PROCESS FOR PREPARING A GASIFIED ICE PRODUCT) discloses a process that comprises: providing a source of liquid water at a temperature below about 5° C.; providing a source of conditionally-stable-hydrate-forming gas at a temperature of about 5 to 10° C.; dispersing the gas within the water at a weight ratio of gas to water within the range of from about 0.10 to about 0.25 to provide a process feed stream; introducing the process feed stream into a dynamic reaction zone at a temperature within about 1° C. of the hydrate formation equilibrium temperature at a preselected process pressure, within the range of from about 300 to about 450 psig, which is maintained within the dynamic reaction zone; maintaining contact between the gas and water under dynamic conditions for a period of time effective to form conditionally stable gas hydrate and to dissolve gas within the water to an extent effective to provide a uniform, flowable suspension of solid, gas hydrate, crystal-like particles in a saturated aqueous solution of carbon dioxide; transporting the suspension to a pressurized freezing vessel which is in communication with the dynamic reaction zone and a pressure control means comprising valve means and means for separating occluded gas from liquid and solid components, said pressure control means being capable of controlling the system pressure to within 5 psig of the preselected pressure, closing the freezing chamber; and freezing the suspension under pressure.

U.S. Pat. No. 5,231,851 (METHOD AND DEVICE FOR CARBONATING AND COOLING A LIQUID (POST MIX EQUIPMENT AB)) concerns a method for carbonating and cooling a liquid, particularly a beverage, wherein carbon dioxide under high pressure is introduced under the liquid surface and is allowed to expand and dissolve in the liquid. The invention also concerns a device for carrying out this method, said device including a closed vessel, a liquid inlet opening into the vessel, a carbon dioxide inlet opening into the vessel under the surface of the liquid, a discharge conduit for carbonated liquid, and, leading from the vessel above the liquid surface a re-circulation conduit for carbon dioxide not dissolved in the liquid. The carbon dioxide is introduced under the liquid surface. Therefore the liquid is first carbonated before cooling. Moreover the apparatus device is said to be suitable for preparing cooled carbonated beverages in households, in offices and the like and does not relate to freezing nor is it suitable for the production of carbonated water ice particles.

U.S. Pat. No. 4,393,660 (QUIESCENT FORMATION OF GASIFIED ICE PRODUCT AND PROCESS (GENERAL FOODS)) discloses a process for preparing gasified ice products characterized by a granular, crystalline, porous structure, a brittle texture, good stability in the frozen state, and the ability to rapidly and quietly release gas upon melting in an aqueous solution. Also provided is the improved product having these characteristics. The process comprises: maintaining aqueous liquid in a pressurized vessel under conditions of temperature and pressure effective to form a stable gas hydrate upon contact with a conditionally-stable-hydrate-forming gas; introducing finely-dispersed bubbles of a conditionally-stable-hydrate-forming gas into said aqueous liquid, at a pressure above that within said vessel to contact said liquid with the said gas; constantly withdrawing gas from said vessel to maintain substantially constant pressure within and flow rate through said vessel; maintaining said contact for a period of time effective to form a suspension comprising gas hydrate dispersed within said liquid; and freezing said suspension under pressure.

U.S. Pat. No. 2,575,509 (ICE PRODUCT AND METHOD OF MANUFACTURING (ICECRAFTER TRUST)) relates to an ice product and to a method by which the product may be manufactured. In producing carbonated ice cubes, or ice charged with other gases, a switch is positioned to cause the enclosed circuit so that the valve will be opened and the valve closed. Thereupon, water is supplied to the freezing unit from the carbonator and charging gas is delivered from the cylinder so that the ice is frozen in the presence of gas under high pressure. In this respect the sequence of operation of the valves is as follows: The motor is first energized, moving the plate into its closed position for sealing the bottom of the freezing unit. The solenoid valve being closed, water is forced under pressure through the supply line, line, carbonator, line, opening valve into the freezing unit until the pressure of the trapped air in each cell equals the pressure of the incoming water, thereby regulating the water level in the cells. The charged water is then frozen.

GB2425165 (MAKING FROZEN CARBONATED BEVERAGES (IMI VISION LTD)) discloses a method for making frozen carbonated beverages. In FIG. 1 of this disclosure a diagram of a machine for producing a frozen carbonated beverage is shown in which the inlet of a compressor is supplied with CO2 from a source of CO2 by means of a valve. The CO2 exits the compressor at a pressure of between 60 and 120 bar and at a temperature of around 180° C. It then passes through a condenser which reduces the temperature of the CO2 to around ambient plus 5° C. before it enters a carbonator, containing a beverage, via a conduit. The conduit terminates in a nozzle which is immersed in the beverage.

U.S. Pat. No. 4,022,119 (LIQUID CARBON DIOXIDE CARBONATION APPARATUS (GENZYME CORP CONS FOODS CORP; SHASTA BEVERAGES)) discloses a method and apparatus that are provided for simultaneously carbonating and cooling a liquid, such as a carbonated beverage. The carbon dioxide is injected in liquid form into the bottom of a carbonating column of liquid. The liquids flows upwardly through the column and then over the top into an annular channel around the same for withdrawal from the vessel.

JP2012/191935 (ICE CREAM CONTAINING CARBON DIOXIDE GAS, AND METHOD FOR PRODUCING THE SAME (LOTTE)) discloses a method for producing ice cream containing carbon dioxide gas that includes: (a) a step of freezing ice-cream mix or frozen-dessert liquid mix obtained by aging at least one raw material selected from milk and defatted milk and injecting carbon dioxide gas into the frozen mix; and (b) a step of filling a container with the ice-cream mix or frozen-dessert liquid mix into which carbon dioxide gas is injected to produce ice cream containing carbon dioxide gas.

Alternatively, the step (b) of filling the container is carried out after carrying out a step of injecting carbon dioxide gas inside a gas mixer after the step (a) of freezing the ice-cream mix or frozen-dessert liquid mix obtained by aging at least one raw material selected from milk and defatted milk.

Similar techniques disclosed in the prior art involve mixing gas into the mix. Again, there is also an issue with such approaches because the mix suffers a concentration reduction in the gas at points in the mix that are further away from the point at which the gas is introduced. Such techniques disclosed in the prior art are as follows.

EP1328162 (CARBON DIOXIDE-HYDRATE PRODUCT AND METHOD OF MANUFACTURE THEREOF) discloses a method for manufacturing a frozen carbonated confection product that allegedly exhibits high CO2 retention without significant dry ice formation and stable storage in the home freezer environment. According to a preferred method of practicing the invention, water at ambient pressure is charged to a reactor and subjected to an inert gas purge. After the purge, the water is chilled to just above the freezing point. The chilled water is agitated, and carbon dioxide under pressure, preferably about 400 psig, is introduced into the reactor where the CO2-hydrate reaction is allowed to proceed with continued agitation for about thirty minutes. The reaction mixture is then cooled to about −5° F., resulting in a solid CO2-hydrate containing product, which is then ground to an acceptable particle size.

WO9618310 (PROCESS TO PRODUCE CARBONATED SEMI-SOLID OR SOLID FOOD AND THE PRODUCT THEREOF (BRIGHAM YOUNG UNIV)) relates to a carbonated semi-solid spoonable food having the following properties: (a) a viscosity of between about 2000 and 200,000 centipoise (cp) at between about 1.5 and 250 C, and (b) a carbonation level of between about 0.5 and 4.0 volumes of carbon dioxide. Preferred foods include yogurt, pudding, gelatin, custard, ice cream mix, and the like. Already fermented yogurt is more preferred. The food is optionally packaged in a conventional food container that has a seal to confine the carbon dioxide. Another embodiment is a process to produce a carbonated thickened semi-solid spoonable food, which process comprises: contacting the food with carbon dioxide gas with low shear agitation at a temperature of between about 8 and 25° C. and carbon dioxide at a pressure of between about 0 and 110 psig for between 1 and 180 min; to produce a carbonated semi-solid thickened food having (a) a viscosity of between about 3000 and 180,000 centipoise at between about 10 and 25° C., and (b) a carbonation level of between about 0.5 and 4.0 volumes of carbon dioxide.

GB1005399 (METHOD OF ENHANCING THE FLAVOUR OF DAIRY DESSERT (AMERICAN MACH AND FOUNDRY)) discloses the discovery that incorporation into a dessert of certain critical amounts of carbon dioxide produces a frozen confection of very desirable characteristics. The disclosure claims particular reference to dairy desserts which are normally consumed in a semi-frozen state.

EP0965563 (MANUFACTURE OF EDIBLE FROZEN PRODUCTS) provides a method of producing a gas hydrate comprising the steps: (i) filling a vessel with an amount of liquid water and/or frozen water, (ii) adding an amount of condensed hydrate forming gas to the vessel in a manner such that the condensed gas does not come into contact with liquid water, (iii) contacting the condensed gas, and/or its sublimation or liquification products at a suitable pressure with the liquid and/or frozen water mixture to produce a reaction mixture, and keeping the reaction mixture at, or below, the maximum temperature at which the gas hydrate is stable and at a suitable pressure for a sufficient time to produce the gas hydrate.

Other disclosures in the prior art use pre-seeding such as U.S. Pat. No. 4,934,153 (METHOD FOR MANUFACTURING ICE CONTAINING CARBON DIOXIDE (NIPPON KOKAN KK)) which discloses a method for manufacturing ice containing carbon dioxide comprises a process wherein ice grains or water as material used for ice containing carbon dioxide is charged into a pressure vessel, a process wherein the material is enveloped in an atmosphere of carbon dioxide and a process wherein a temperature and a pressure of the material is adjusted so that the temperature and the pressure can be values in the range enclosed with straight lines connecting particular points on a graph of temperature against pressure.

Flash freezing is another approach as described in the journal article "Production of CO2 clathrate hydrate frozen desserts by flash freezing" (Peters, T. B.; Smith, J. L.; Brisson, J. G—Journal of Food Engineering (2010), Volume 100, Number 4, pp. 669-677) which discloses a CO2 flash-freezing process developed to form CO2 hydrates during freezing of a dessert mixture. In the process, liquid CO2 and liquid dessert mixture are emulsified and then sprayed into a chamber in which the CO2 flashes to a vapor causing the dessert mixture to freeze into a low-density powder.

However, pre-seeding and flash freezing techniques are relatively complex approaches and are not necessarily suitable for industrial-scale production of gas hydrate.

Finally, other approaches may use pressure contact between the gas to be dissolved and the solution. Such approaches are as follows.

WO9716980 (PROCESS FOR THE PREPARATION OF AN ICE CONFECTION (UNILEVER)) discloses, in Example 2, that 002-water clathrate-containing particles were produced as follows: In a pressurized reactor, CO2 was contacted with water at a pressure of 35 bar and a temperature of 5° C. Thereafter the temperature was reduced to −15° C. such that the carbonated composite solidifies. After removal from the reactor, the clathrate-ice composite formed was ground in a mill at −20° C. to a particle size of from 50 to 200 mm.

US20099266106 (METHOD AND APPARATUS FOR PRODUCING CLATHRATE HYDRATE SLURRY, AND METHOD FOR OPERATING THE SAME APPARATUS) discloses a method of producing a clathrate hydrate slurry, comprising steps of feeding an aqueous solution of a guest compound for the clathrate hydrate or a slurry of the clathrate hydrate dispersed or suspended in an aqueous solution or water into a heat transfer tube and heat-exchanging the aqueous solution or the slurry with a refrigerant present at an outer periphery of the heat transfer tube thereby generating a clathrate hydrate in the aqueous solution or the slurry, characterized in that increase in an amount of the clathrate hydrate deposited on a heat transfer tube inner wall surface in a process of heat exchange with the refrigerant is suppressed by flow force of the aqueous solution or the slurry flowing inside the heat transfer tube.

U.S. Pat. No. 4,333,315 (PROCESS FOR PREPARING A GASIFIED ICE PRODUCT) discloses a process that comprises: contacting aqueous liquid in a closed pressure vessel with a conditionally-stable, hydrate-forming gas under conditions of pressure and temperature effective to form a stable gas hydrate; vigorously agitating the aqueous liquid during the period of contact to disperse bubbles of the gas therein in continuous, efficient mass transfer contact; maintaining contact for a period of time effective to form a suspension comprising gas hydrate dispersed within said aqueous liquid; degasifying the suspension by gentle agitation to dislodge unreacted and undissolved gas bubbles from the suspension and permit them to rise to the upper surface thereof; transporting the suspension through a port in the vessel while under pressure to a pressurized freezing chamber; and freezing the essentially gas bubble-free suspension under pressure.

WO10069769 (METHOD FOR PRODUCING AN EDIBLE GAS HYDRATE) provides a method of producing an edible composite of gas hydrate and ice using an extruder comprising a barrel having an inlet and an exit and provided with cooling means, the method comprising: (a) feeding an aqueous gas solution at an elevated pressure into the barrel of the extruder via the inlet; (b) cooling the barrel to form a frozen plug within the extruder so that the pressure inside the barrel is at or above the minimum pressure required for gas hydrate formation; (c) freezing the gas solution inside the barrel to form the composite; and (d) extruding the frozen composite from the extruder exit.

GB 1095004 and U.S. Pat. No. 3,220,204 disclose an apparatus for forming gas hydrates of CO2 in water by passing water into a tube under an atmosphere of pressurised CO2. So that the material can leave the tube easily care is taken to ensure that no freezing takes place within the tube so that liquid water carrying the gas hydrates leaves the tube. A subsequent step of freezing is then carried out.

However, none of these processes adequately address the issue of heterogeneous or diminishing activity of the particles in the reaction vessel.

There therefore remains a need for an approach that overcomes these issues and provides a process that is industrially applicable, efficient and capable of producing on a large scale gas hydrate that is of high activity and that is consistent in its activity i.e. in the amount of gas that it contains and is able to release upon consumption by the consumer.

As set out below, the present invention provides an approach that addresses all these requirements.

SUMMARY OF THE INVENTION

We have now found that a particular process addresses the foregoing issues. In particular the process of the invention does not require the use of pre-carbonated or previously established aqueous gas solutions. Instead, a liquid aqueous phase flows over a heat exchange surface in a thin layer under an atmosphere of water-soluble pressurised gas. The gas typically passes into the solution along the entire heat exchange surface, gas hydrates are consistently formed across and along the entire heat exchange surface, and therefore gas hydrates/water ice particles subsequently produced do not suffer from heterogeneous or reduced drops in activity across the heat exchange surface. By "activity" is meant the volume of gas at room temperature per unit mass of particles, typically measured in units of ml/g.

The invention relates to a process for the manufacture of frozen gas hydrates, the process comprising passing a liquid aqueous phase over a heat exchanger surface under an atmosphere of a pressurised water-soluble gas, characterised in that the conditions of the process are selected to ensure that there is simultaneous dissolution of the pressurised gas into the liquid aqueous phase, and the formation of a solidified continuous phase from solidification of the liquid aqueous phase in contact with the heat exchanger surface.

Thus, the invention provides for the dissolution of the gas, the formation of the gas hydrates and freezing of the liquid phase in a single process step. The process is therefore more efficient and convenient than prior art processes.

The liquid aqueous phase may be passed over a heat exchange surface by, for example, flowing over the surface.

Preferably the thickness of the liquid aqueous phase is no greater than 0.5 cm as this assists with the diffusion of the water-soluble gas into the aqueous phase and towards the heat exchange surface. Preferably the aqueous phase is in a layer of at least 0.005 cm in thickness, more preferably at least 0.01 cm, more preferably still at least 0.02 cm, even more preferably at least 0.03 cm, yet more preferably at least 0.04 cm, still more preferably at least 0.05 cm, even more preferably at least 0.06 cm in thickness.

Preferably the heat exchange surface is at temperature of at least −30° C., more preferably at least −25° C., more preferably still at least −20° C., even more preferably at least −18° C., yet more preferably at least −16° C., still more preferably at least −14° C., more preferably at least −12° C., even more preferably at least −11° C., most preferably at least −10° C.

Preferably the heat exchange surface is at temperature of at most 0° C., more preferably at most −1° C., more preferably still at most −2° C., even more preferably at most −3° C., yet more preferably at most −4° C., still more preferably at most −5° C., more preferably at most −6° C., even more preferably at most −7° C., most preferably at most −8° C.

Preferably the pressure of water-soluble gas is constant over the heat exchange surface.

Preferably the process is carried out under a pressure of at least 1000 kPa, more preferably at least 1500 kPa, more preferably still at least 1750 kPa, even more preferably at least 2000 kPa, yet more preferably at least 2100 kPa, still more preferably at least 2200 kPa, more preferably at least 2300 kPa, even more preferably at least 2400 kPa, most preferably at least 2500 kPa.

Preferably the pressure is at most 4000 kPa, more preferably at most 3750 kPa, more preferably still at most 3500 kPa, even more preferably at most 3250 kPa, yet more preferably at most 3000 kPa, still more preferably at most 2750 kPa, more preferably at most 2700 kPa, even more preferably at most 2650 kPa, most preferably at most 2600 kPa.

Preferably the aqueous phase is in a layer of at most 0.40 cm in thickness, more preferably at most 0.25 cm, more preferably still at most 0.20 cm, even more preferably at most 0.15 cm, yet more preferably at most 0.125 cm, even more preferably still at most 0.10 cm, yet more preferably still at most 0.09 cm, most preferably at most 0.08 cm in thickness.

Preferably the liquid aqueous phase is introduced to the heat exchanger surface containing substantially no dissolved water-soluble gas. Thus, the water-soluble gas diffuses into the liquid aqueous phase and forms gas hydrates in a single step.

Preferably the gas is carbon dioxide.

Preferably the process is a batch process and the solidified continuous phase grows in thickness until a desired thickness is obtained. The produced solidified phase containing the gas hydrates and/or frozen water can then be removed from the apparatus and the process begun again.

To facilitate removal of the solidified phase the process is preferably followed by the step of warming the heat exchanger surface so that the solidified continuous phase that is in contact with the heat exchanger surface melts to facilitate removal of the solidified continuous phase from the heat exchanger surface Preferably the heat exchanger surface is the inside of a tubular pipe.

In a preferred arrangement the process conditions are such that a proportion of the liquid aqueous phase remains liquid after passing over and leaves the heat exchanger surface.

Preferably the liquid that leaves the heat exchange surface is recirculated to reintroduce the liquid to the heat exchange surface. Preferably the liquid is heated before reintroduction to the heat exchange surface to ensure that it does not contain any gas hydrates.

Preferably the frozen product formed by the process is comminuted to form ice particles containing gas hydrate.

DETAILED DESCRIPTION OF THE INVENTION

Unless defined otherwise, all technical and scientific terms used herein have the same meaning as commonly understood by one of ordinary skill in the art (e.g. in frozen confectionery manufacture). Definitions and descriptions of various terms and techniques used in frozen confectionery manufacture are found in Ice Cream, 6th Edition, Robert T. Marshall, H. Douglas Goff and Richard W. Hartel (2003), Kluwer Academic/Plenum Publishers. All percentages, unless otherwise stated, refer to the percentage by weight based on the frozen confection.

By "thickness" is meant the average thickness of a layer as measured by taking a point on one surface or side of the layer, measuring the minimum distance from that point to the other surface or side of the layer, repeating these measurements N times and then dividing the sum of the N minimum distances by N, e.g. ten times at spaced apart locations alone the heat transfer surface.

Composites of gas hydrate and ice consist of gas hydrate crystals trapped within an ice structure. A gas hydrate is a crystalline solid which consists of gas molecules surrounded by cages of water molecules. Thus it is similar to ice, except that the crystalline structure has a guest gas molecule within the cage of water molecules. Many gases have molecular sizes suitable to form hydrates, including carbon dioxide ($CO_2$) and nitrous oxide ($N_2O$). In the context of the present invention, gases comprising or consisting of carbon dioxide and/or nitrous oxide are preferred.

Suitable temperature and pressure conditions for the formation of carbon dioxide or nitrous oxide gas hydrates can be derived from the phase diagrams of the respective gas-aqueous liquid combination, which are available in the literature. For example, the phase diagram for carbon dioxide gas hydrates is given in FIG. 1.

Gas hydrates have a stoichiometric formula: for carbon dioxide gas hydrate the theoretical maximum is $CO_2*5.75H_2O$. However, gas hydrate crystals are unstable at atmospheric pressure (even at typical cold store temperatures). Therefore, when gas hydrates are prepared for use in frozen confections, an excess of water (i.e. more water than prescribed by the stoichiometric ratio) is typically used so that a composite of gas hydrate crystals in ice is formed. The ice around the hydrate crystals is essential in order to prevent the decomposition of the hydrates during manufacture and storage. In effect, the ice acts as a microscopic pressure vessel. On warming (e.g. in the mouth when consumed), the ice layer around the gas hydrate crystals melts, and the gas hydrate decomposes releasing the gas. This provides a "fizzing" sensation similar to that of carbonated drinks.

The applicants have sought to devise an improved process for the preparation of gas hydrates. We have found that if a thin layer of a liquid aqueous phase is passed over a heat exchange surface (for example by flowing over the surface), under an atmosphere of pressurised gas then gas hydrates are readily formed, in a consistent fashion, and with high activity.

In its simplest product form, the aqueous phase may consist substantially only of water so that the final product consists substantially of only ice and gas hydrate. However, one or more optional other ingredients may be added to the aqueous phase; and/or converge with the gas feed; and/or be introduced as one or more separate product streams. Preferably the aqueous phase, before gas dissolution, comprises at least 90 percent, more preferably at least 95 percent, most preferably at least 99 percent by weight of water.

The aqueous phase may also contain one or more sweeteners. Sweeteners are standard ingredients in frozen confections since they provide sweetness and control the ice content via freezing point depression. Therefore the aqueous phase preferably comprises at least 0.01 percent, preferably at least 0.1 percent, more preferably at least 0.2 percent but also preferably at most 20 percent, more preferably less than 10 percent, even more preferably less than 5 percent, most preferably less than 1 percent by weight of one or more sweeteners. Sweeteners include mono- and disaccharides sugars, such as dextrose, fructose, sucrose and lactose;

oligosaccharides containing from 3 to ten monosaccharide units joined in glycosidic linkage; corn syrups and maltodextrins; sugar alcohols (also known as polyols or polyhydric alcohols), such as erythritol, arabitol, glycerol, xylitol, sorbitol, mannitol, lactitol, maltitol, hydrogenated starch hydrolysate (HSH)—also known as polyglycitol, isomalt and palatinit.

Optionally, the aqueous phase may also comprise other ingredients typically used in frozen confections, such as stabilisers, colours and flavours.

In order to ensure that gas hydrates form in the process, the heat exchange surface is preferably at temperature of at least −30° C., more preferably at least −25° C., more preferably still at least −20° C., even more preferably at least −18° C., yet more preferably at least −16° C., still more preferably at least −14° C., more preferably at least −12° C., even more preferably at least −11° C., most preferably at least −10° C. Preferably the heat exchange surface is at temperature of at most 0° C., more preferably at most −1° C., more preferably still at most −2° C., even more preferably at most −3° C., yet more preferably at most −4° C., still more preferably at most −5° C., more preferably at most −6° C., even more preferably at most −7° C., most preferably at most −8° C.

It has been found that the process of the present invention operates best under a range of pressures of the gas which will be incorporated into the hydrate. By "pressure" is meant partial pressure i.e. the pressure that the gas exerts in a gas mixture. The process is preferably carried out under a pressure of at least 1000 kPa, more preferably at least 1500 kPa, more preferably still at least 1750 kPa, even more preferably at least 2000 kPa, yet more preferably at least 2100 kPa, still more preferably at least 2200 kPa, more preferably at least 2300 kPa, even more preferably at least 2400 kPa, most preferably at least 2500 kPa. Preferably the pressure is at most 4000 kPa, more preferably at most 3750 kPa, more preferably still at most 3500 kPa, even more preferably at most 3250 kPa, yet more preferably at most 3000 kPa, still more preferably at most 2750 kPa, more preferably at most 2700 kPa, even more preferably at most 2650 kPa, most preferably at most 2600 kPa.

In order for the dissolved gas to reach the freezing interface between the liquid aqueous phase and the heat exchange surface the liquid aqueous phase is preferably in a layer of at most 0.40 cm in thickness, more preferably at most 0.25 cm, more preferably still at most 0.20 cm, even more preferably at most 0.15 cm, yet more preferably at most 0.125 cm, even more preferably still at most 0.10 cm, yet more preferably still at most 0.09 cm, most preferably at most 0.08 cm in thickness. Preferably the liquid aqueous phase is in a layer of at least 0.005 cm in thickness, more preferably at least 0.01 cm, more preferably still at least 0.02 cm, even more preferably at least 0.03 cm, yet more preferably at least 0.04 cm, still more preferably at least 0.05 cm, even more preferably at least 0.06 cm in thickness.

As the liquid aqueous phase passes over the heat exchange surface, the liquid aqueous phase freezes thereby to create a frozen layer containing the gas hydrates. At first this frozen layer builds up on the heat exchange surface but as the process progresses it will be appreciated that the frozen layer will cover the heat exchange surface. As this happens the interface between the frozen layer and the liquid aqueous phase will still act as the heat exchange surface, the liquid aqueous phase will continue to pass over this heat exchange surface, and the liquid aqueous phase will continue to freeze and create further gas hydrates. The heat exchange surface may be flat, wavy, have vanes, or be curved whether convexly or concavely. Preferably the heat exchange surface forms an enclosed tube along which the liquid aqueous phase passes and hence in which the gas hydrates are formed as a tube within the tube. The thickness of the frozen layer containing the gas hydrates (at the time the gas hydrates are removed from the apparatus) is preferably at least 0.1 cm, more preferably at least 0.25 cm, more preferably still at least 0.5 cm, yet more preferably at least 0.6 cm, yet more preferably still at least 0.7 cm, even more preferably at least 0.8 cm, even more preferably still at least 0.9 cm. The thickness of the frozen layer containing the gas hydrates is preferably at most 4 cm, more preferably at most 2 cm, more preferably at most 1.9 cm, more preferably still at most 1.75 cm, yet more preferably at most 1.6 cm, yet more preferably still at most 1.5 cm, even more preferably at most 1.4 cm, even more preferably still at most 1.3 cm, more preferably still at most 1.2 cm, yet more preferably still at most 1.1 cm. Most preferably the thickness of the frozen layer containing the gas hydrates is 1 cm.

The material formed by the process is in the form of solid gas hydrate or a composite of gas hydrate and ice having a high hydrate content. The material is generally intended as an additive to frozen confections to make them fizzy in the mouth. Thus after production, the material is typically broken, cut, or comminuted into pieces of any desired size (for example approximately 1-5 mm). The pieces may be packaged directly, or they may be mixed with a sauce or incorporated into a frozen confection such as ice cream, sorbet or water ice to form a final product.

The term "frozen confection" means a fabricated foodstuff intended for consumption in the frozen state (i.e. under conditions wherein the temperature of the foodstuff is less than 0° C. and preferably under conditions wherein the foodstuff comprises significant amounts of ice). Frozen confections include ice cream, sorbet, sherbet, frozen yoghurt, water ice, milk ice and the like. Frozen confections such as ice cream and frozen yoghurt typically contain fat, protein (such as milk protein) sugars, together with other minor ingredients such as stabilisers, emulsifiers, colours and flavourings. Water ice typically contains, by weight of the composition 15-25 percent sugars together with stabilisers, colours and flavourings.

Typically the other ingredients have already been combined to produce a frozen confection (e.g. ice cream) or a sauce/syrup, into which the gas hydrate/ice pieces are mixed. Preferably the edible gas hydrate/ice composite constitutes from 5 to 50 wt %, preferably 10 to 20 wt % of the total frozen confection. After combining the gas hydrate/ice composite with the other ingredients, the frozen confection may be subjected to a further freezing step (e.g. hardening), and may then be packaged.

The invention will now be explained in more detail by way of the following description of a preferred embodiment and with reference to the accompanying drawings.

Except in the operative and comparative examples, all numbers in the description indicating amounts of materials, conditions of reaction, physical properties of materials, and/or use are to be understood as being preceded by the word "about".

Where values are disclosed as a range of upper and/or lower and/or preferred limits, all limits may be combined thereby to describe preferred ranges.

The invention will now be illustrated with reference to the following figures, in which.

EXAMPLES

Machine Assembly and Working Principle

Figure 2:
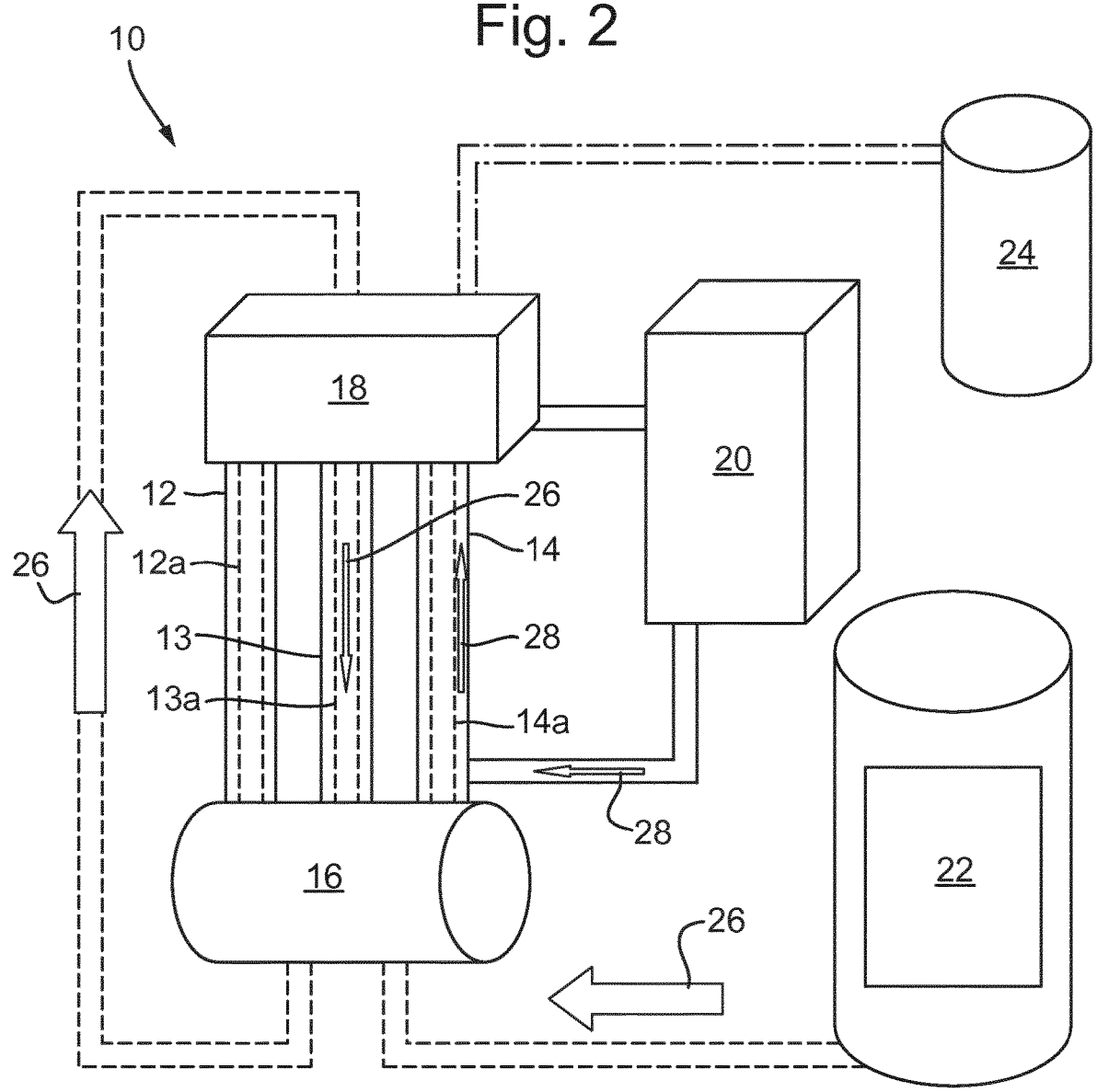
FIG. 2 shows a flow diagram of the pilot plant-scale gas hydrate machine for carrying out the process of the invention.

As it can be seen in FIG. 2, an apparatus 10 was prepared consisting of three jacketed columns 12, 13, 14, a jacketed sump 16, a header tank 18, a recirculation pump (centrifugal pump) 20, a feed tank 22 and CO2 supply 24 with regulator. Each jacketed column 12, 13, 14 comprises a respective freezing tube 12*a*, 13*a*, 14*a*. The freezing tubes had an internal diameter of 22.4 mm and length of 60 cm. The sump volume was approximately 6 litres. The cooling medium used was potassium formate solution, which was chilled/heated by means of "Tricool" heater and chiller units. The equipment was pressurised with CO2 24. Demineralised water was pumped from the sump 16 into the header tank 18 and then flowed down the column walls in a thin laminar flow by gravity back into the sump 16.

The water flowed down the inside of freezing tubes 12*a*, 13*a*, 14*a*, in a thin layer in the direction of arrows 26 and the internal part of the tube was free from water to maintain a hollow central channel which contained pressurised CO2 gas. The tubes were cooled by pumping the cooling agent on the outside of the tubes, in the direction of arrow 28, from the bottom of the columns 12, 13, 14 to the top so that the tubes 12*a*, 13*a*, 14*a* were cooled on their outer surface. Thus, the heat exchange surface was the inside of the tubes 12*a*, 13*a*, 14*a*. Therefore, a counter current heat exchange took place with the demineralised water inside the column cooling down and crystallizing.

The process was arranged so that some water exited the columns to ensure that all of the heat exchange surface was covered in water and to help ensure even growth of the solidified layer throughout the tubes. The temperature of the sump was high enough to knock out any formed gas hydrates in the water entering it from the tubes so that any recirculating water entered the tubes again free of gas hydrates.

Since a CO2 pressure was applied, instead of crystallizing to ice crystals, the water enclosed CO2 molecules and hydrates were formed. Moreover, because the pressure was constant across the height of the columns, the rate at which the CO2 molecules were enclosed by the water was constant throughout the columns. The hydrate formation was exothermic and the developing heat was removed to enable further crystallization. The hydrates built up from the surface of the tubes 12*a*, 13*a*, 14*a* towards the centre, therefore hollow cylinders developed.

The interface between the frozen water containing the gas hydrate and the water that continued to flow down in a thin layer provided the heat exchange surface and gas hydrates continued to form. Due to the counter current heat exchange the developed tubes were thicker in the bottom. After a run was finished, the recirculation of demineralised water was stopped, the pressure was released and the columns were warmed up by a warmer fluid flowing through the jacket. The columns were then opened at the bottom and the tubes of ice containing the gas hydrates were released. The tubes were then comminuted to form the gas hydrate containing particles.

Physical/Chemical Process

Figure 1:
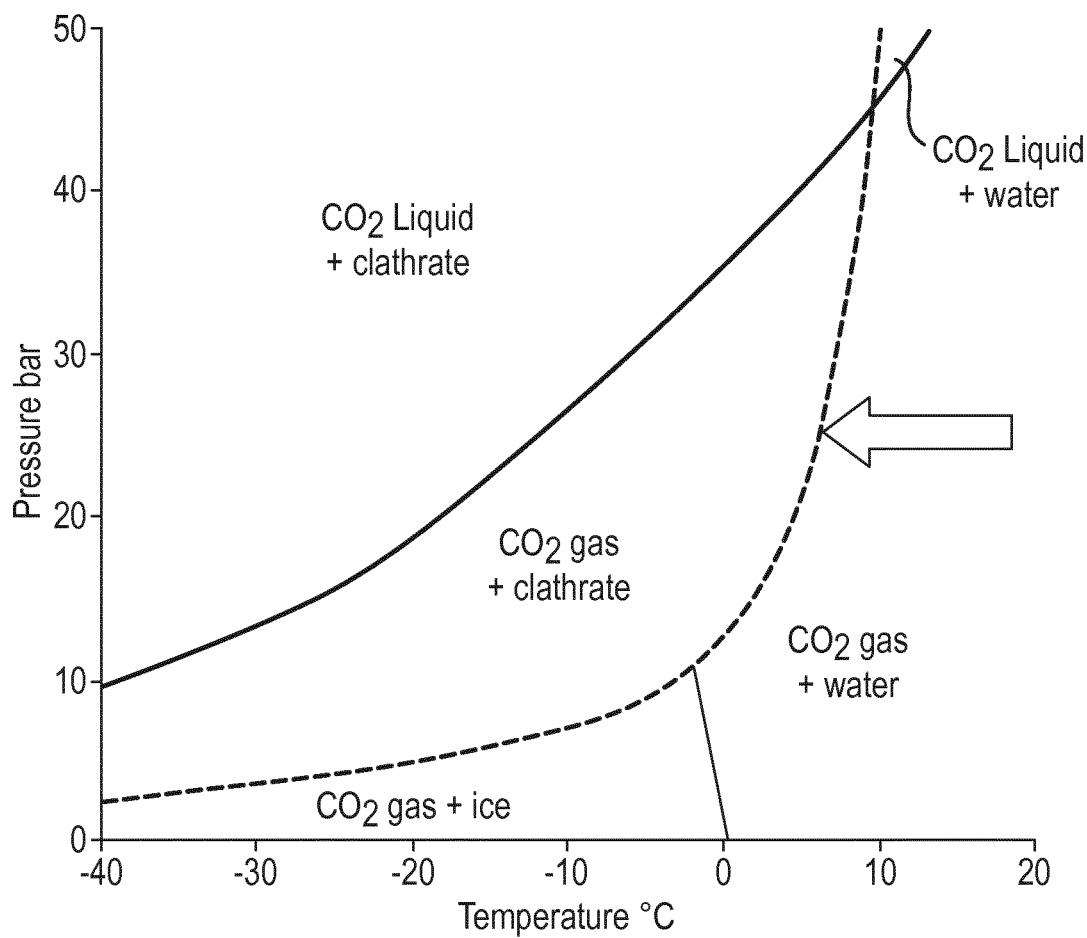
FIG. 1 shows the phase diagram for Carbon Dioxide/Ice Clathrate.

During a run, the "working point" on the phase diagram (FIG. 1) was determined. The applied pressure of (e.g. 25 bar) was the first point and as the CO2 gas, liquid water and clathrates were present at the same time, the run had to take place on the marked line.

During each run, the temperatures in the top box and in the sump were written down. From this, the development of each run was monitored. Each run exhibited a similar behaviour: The temperature dropped continuously until a minimum was reached. At this minimum temperature the crystallisation started, since the temperature rose after this point due to hydrate formation being exothermic. The temperature increased until it reached the pressure dependent equilibrium temperature. In this case, equilibrium means that on the one hand, new crystallisation takes place and heat is released, while on the other hand the heat is transported away by the cooling device.

Procedure During the Experiments

Demineralised water was filled into the sump by using the recirculation pump and setting the valves into the filling position. When approximately 50% of the complete available volume of the sump was filled the valves were changed to the "circulation" position. The system was then pressurized to the desired pressure by opening the gas supply, the pump was then started and the circulation of the demineralised water began. After 1 minute, the cooling device was turned on and cooling fluid about −20° C. flowed up from the bottom to the top of the jacket of the columns. The gas hydrate started to build up after a few minutes. After the running time (approx. 25 min) the pump was stopped and the pressure was released through the sump. The columns were opened at the bottom and the jacket was flushed by a warmer liquid (approx. 7° C.). The tubes were melted out after 2 min of warming.

Experimental Design

An experimental design was created to investigate the parameters of "pressure", "pumping velocity" and "amount of water in the sump". For each parameter a low, middle and high level was determined. Pressures of 18, 25, and 32 bar were used. Pumping velocity was set by means of a rotary switch at 35, 40 and 45 Hz. The sump was filled to a volume of 2.9 litres, 4.0 litres and 5.2 litres.

Some combinations did not run correctly. For example one experiment with 32 bar and a low amount of water failed after a short running time as all the water was crystallised and the pump ran empty. Another combination at 18 bar did not work as the level sensor in the top box started to flash and the pump stopped working.

Each combination of working settings was run at least four times. Since the first run always exhibited a slightly different behaviour, the result of the first run was always excluded. In some cases more repetitions were conducted if a result was questionable or unforeseen events happened. Only results of unobjectionable runs were taken into account.

For each experiment the amount of product (yield) was weighed. The bottom part of each gas hydrate tube was individually packed into a plastic bag and immediately placed in a −25° C. freezer. After a day of storage, one piece of gas hydrate was removed and the activity was determined.

Statistical analysis of the experimental data (i.e. results of weight/yield determination and activity measurement) demonstrated the interactions between the parameters. A multiple regression was applied.

Model for the Yield

Figure 3:
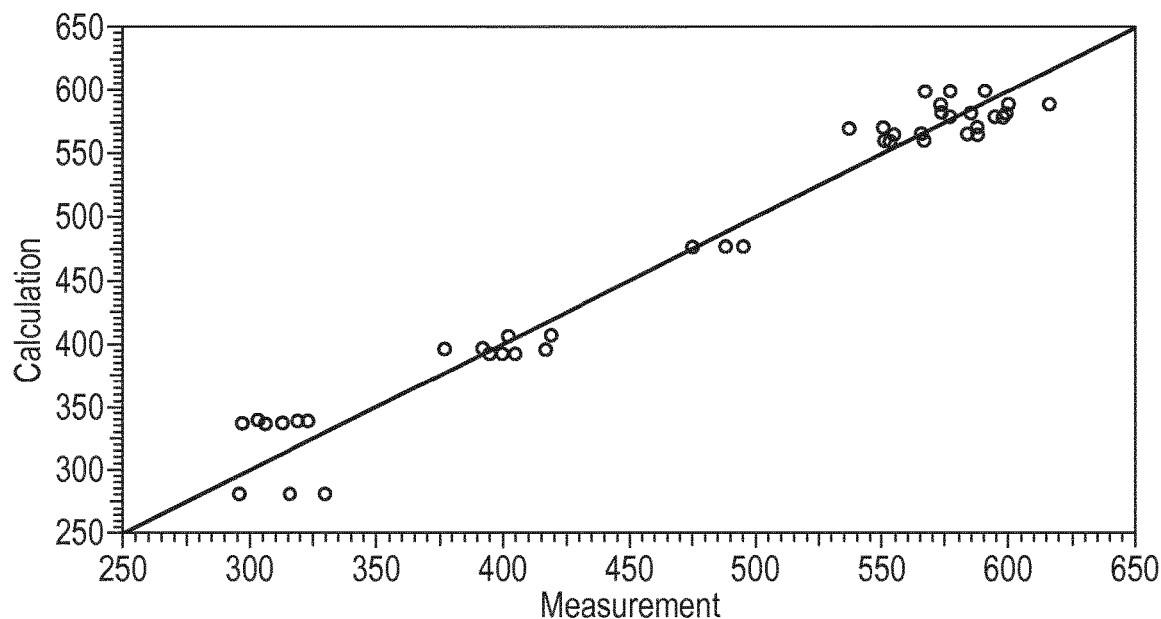
FIG. 3 shows a comparison of calculated and measured data for the yield model.

A model, which describes the influence of the parameters on the output variable (=yield) was calculated. The quality of this model was found to be good with a coefficient of determination ($R^2$) having a value of 97%. Also the repeatability ($W^2$) achieved a high value of 98%. In FIG. 3 the comparison of calculated and measured values (for the yield) can be seen.

Figure 4:
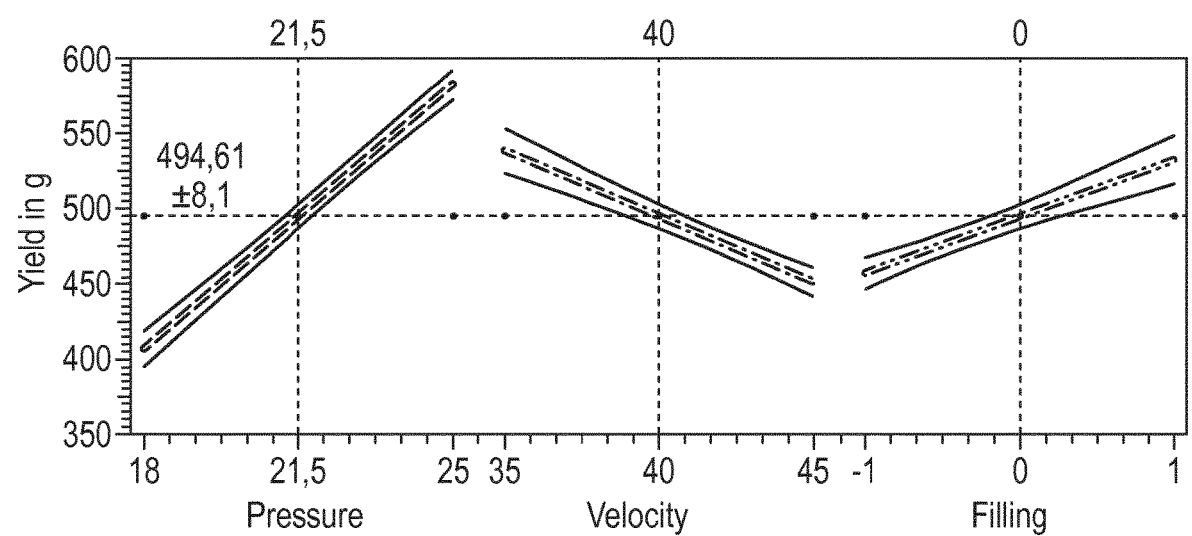
FIG. 4 shows absolute effect of the parameters on the yield.

Statistically, all 3 parameters were highly significant (P<1%). The parameter showing the greatest effect on the yield was pressure (FIG. 4). By increasing the pressure from 18 to 25 bar the yield was increased from around 405 g to 580 g per run (with the other parameters being on the middle settings). In comparison, both pumping velocity and filling level of the sump exhibited lower absolute effects. The impact of the pump velocity was counter-proportionate: The faster the pump ran, the lower the yield. The yield decreased from 535 g to 450 g. An increasing amount of water in the sump had a positive effect on the yield: The yield increased from 455 g to 530 g by increasing the amount of water.

Figure 5:
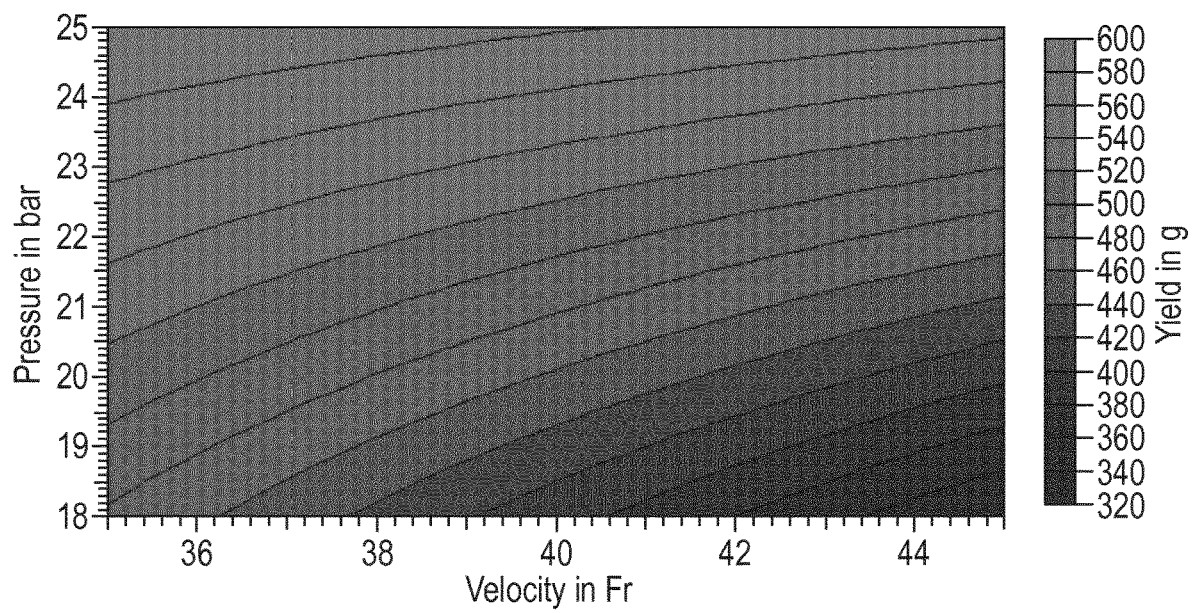
FIG. 5 shows effect of pressure and velocity on the yield.
Figure 6:
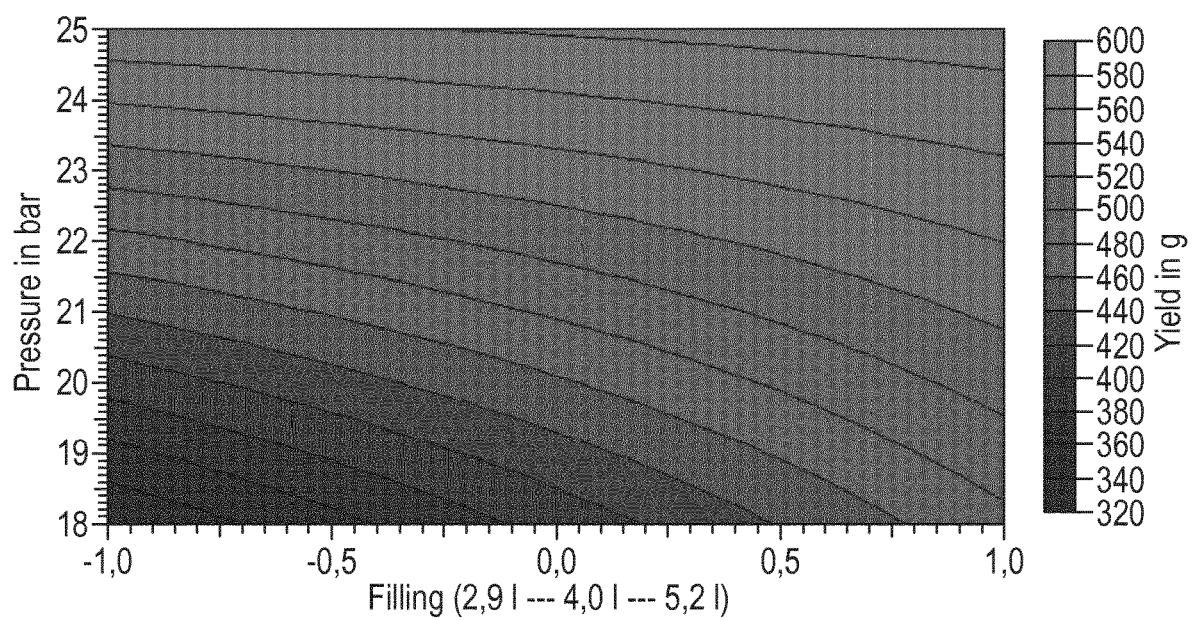
FIG. 6 shows effect of pressure and filling of the sump on the yield.

The effect of velocity and filling was only noticeable at 18 bar, as it can be seen in FIGS. 5 and 6. As an example, the yield can be increased from 320 g to 460 g just by decreasing the pump velocity (at settings of 18 bar pressure and 4.0 litres sump content). On the other hand, at 25 bar the yield will change only to a very small extent by changing the velocity.

The effect of the filling can be accounted for by the use of a constant sump jacket temperature in the experiments. After a certain running time each run equilibrates to a specific temperature, which depends on the applied pressure. For 25 bar this is about 6° C., whereas at 18 bar this is at about 4° C. The sump was jacketed and warmed to prevent freezing. This temperature for all experiments was set at 6° C. At 25 bar this temperature does not work against the crystallisation process, since it is close to the equilibrium temperature. In the case of 18 bar, the sump warming heats up the whole system and prevents some molecules from crystallising. With a high amount of water in the sump this warming-up-effect is less pronounced as the ratio of wall surface/water amount gets smaller. The increased yield at a higher pressure can be explained by an increased heat transport: Since the temperature (from the working point on the phase diagram) at 25 bar is higher than at 18 bar, the temperature gradient between cooled wall and surrounding water is larger, therefore Q' in the equation $Q'=1c*A*\Delta T$ rises in comparison to 18 bar.

Model for the Activity

Figure 7:
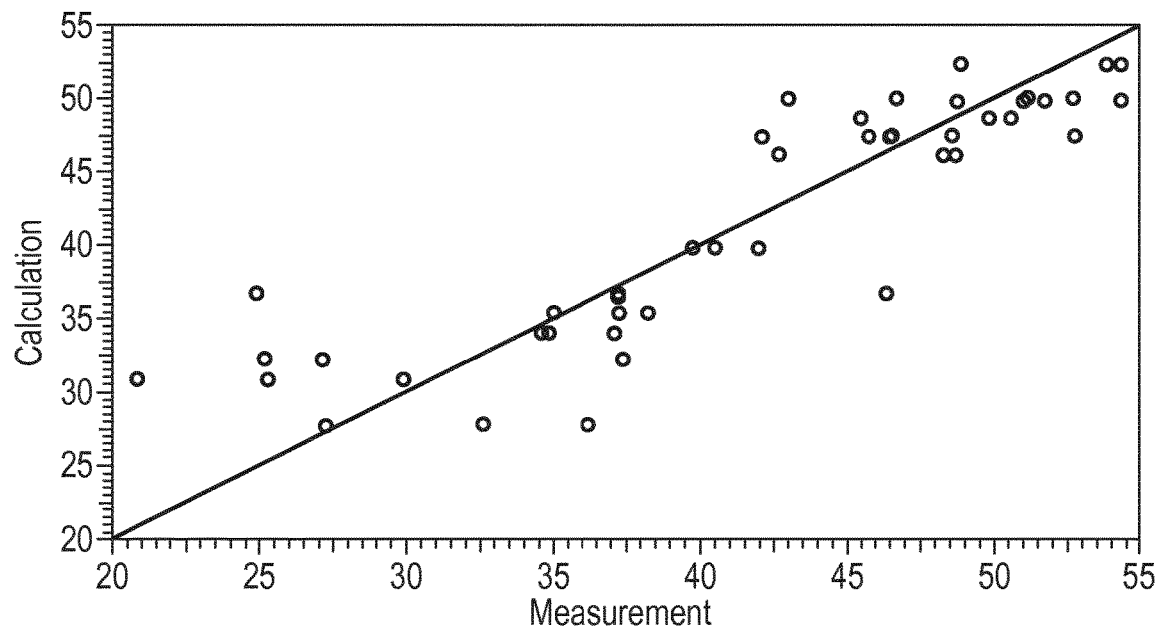
FIG. 7 shows comparison of calculated and measured data for the activity model.
Figure 8:
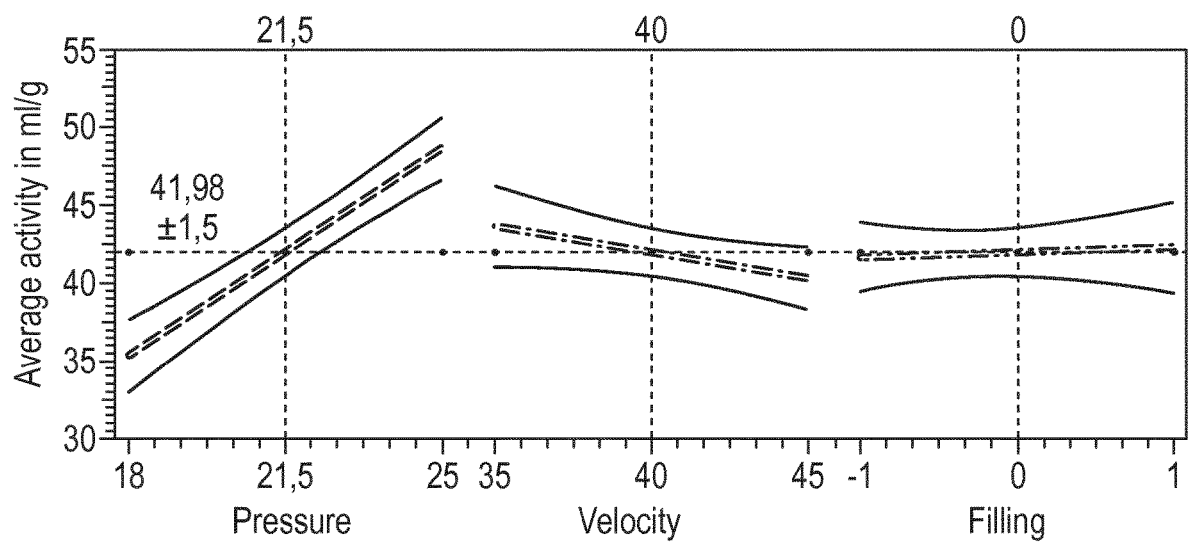
FIG. 8 shows the influence of pressure, velocity and filling on the measured activity.

Samples were taken from the bottom of the gas hydrate tubes. The thick parts at the bottom were in most cases filled up with grey material, believed to be a high percentage of hydrate material. Although this approach helped to reduce the variability of the measured activity, the raw data was still quite inconsistent and therefore, the quality of the model (FIG. 7) was not as good as in the model of the yield. Only pressure had a highly significant effect on the activity, whereas the velocity and the filling were not significant. As it can be seen in FIG. 8, the activity increases from ca. 35 ml/g to over 47 ml/g by increasing the pressure from 18 to 25 bar (however, the error interval (95% probability of error) was quite large).

Relationship Between Yield and Activity

Figure 9:
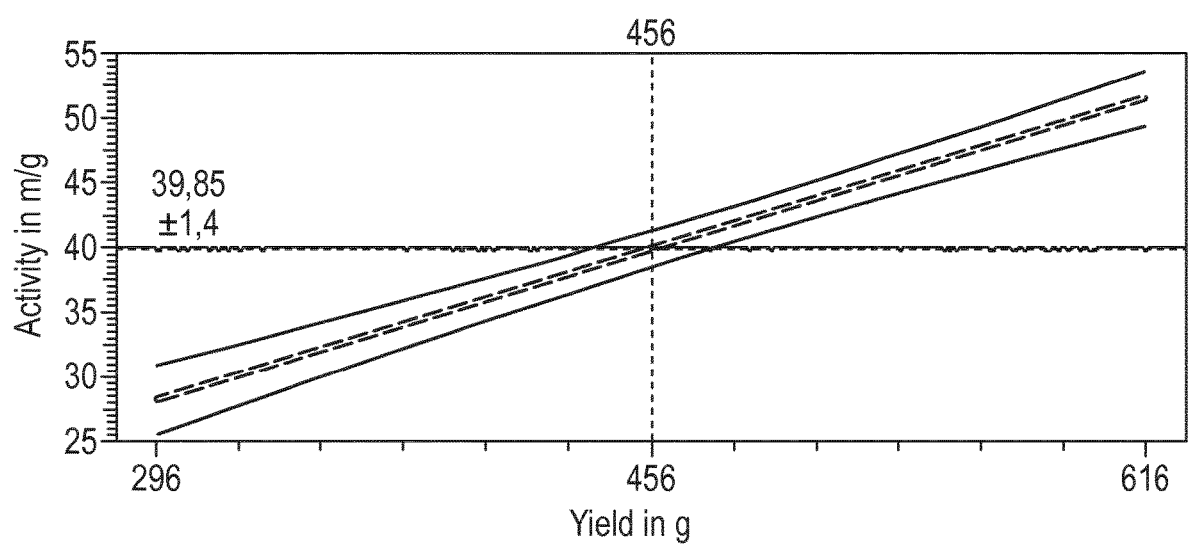
FIG. 9 shows the increase of activity by increased yield.

If the conditions are right, then 100% of pure hydrates with an activity of maximally 150 ml/g might be produced. Since a certain percentage decomposes while it is melted out of the columns, the activity measured by this method decreases for the whole diameter. Consequently, the thicker a tube is, the smaller is the percentage of the decomposed hydrates and the higher the average activity will be. The data of the experiments was used to find a correlation between yield and activity. A model was calculated, which had a coefficient of correlation $R^2$ of 78%. The relatively low value can be explained by variations in the activity values. Overall, as it can be seen in FIG. 9, a low yield is associated with a low activity of below 30 ml/g, whereas an increased yield helps to achieve a higher activity.

SUMMARY

A set of experiments was conducted and analysed with an aim to find the influence of parameters (pressure, pumping speed, amount of water in the system) on the process and the product. For each run, the yield and the activity were determined and a model was calculated. For the yield it could be shown that, although the pressure exhibited the largest effect, also the pumping velocity and the amount of water in the sump are important, especially regarding a low pressure (18 bar). Conversely, at 25 bar these two parameters were not exhibiting a strong effect and therefore, the process will run robustly, irrespectively of other settings. For the activity model, only the pressure proved to be significant, with a higher pressure correlated to a higher activity.

The invention claimed is:

1. A process for the manufacture of frozen gas hydrates, the process comprising passing a liquid aqueous phase over a heat exchanger surface under an atmosphere of a pressurised water-soluble gas, characterised in that the conditions of the process are selected to ensure that there is simultaneous dissolution of the pressurised gas into the liquid aqueous phase, and the formation of a solidified continuous phase from solidification of the liquid aqueous phase in contact with the heat exchanger surface.

2. A process according to claim 1, wherein the thickness of the liquid aqueous phase is no greater than 0.5 cm.

3. A process according to claim 1, wherein the heat exchange surface is at a temperature of from −30 C to 0° C.

4. A process according to claim 1, wherein the pressure of the water-soluble gas is constant over the heat exchange surface.

5. A process according to claim 1 wherein the process is carried out under a pressure of from 1000 kPa to 4000 kPa.

6. A process according to any claim 1, wherein the gas is carbon dioxide, nitrous oxide or a mixture thereof.

7. A process according to any claim 1, wherein the liquid aqueous phase is introduced to the heat exchanger surface containing substantially no dissolved water-soluble gas.

8. A process according to any claim 1, which is a batch process and the solidified continuous phase grows in thickness until a desired thickness is obtained.

9. A process according to claim 8, which is followed by the step of warming the heat exchanger surface so that the solidified continuous phase that is in contact with the heat exchanger surface melts to facilitate removal of the solidified continuous phase from the heat exchanger surface.

10. A process according to claim 1, wherein the heat exchanger surface is the inside of a tubular pipe.

11. A process according to any claim 1, wherein the process conditions are such that a proportion of the liquid aqueous phase remains liquid after passing over and leaves the heat exchanger surface.

12. A process according to claim 11, wherein the liquid that leaves the heat exchange surface is recirculated to reintroduce the liquid to the heat exchange surface.

13. A process according to claim 1, followed by the step of taking the solidified continuous phase and comminuting it to form frozen ice particles, gas hydrates or mixtures thereof.

14. A process according to claim 13 wherein the particles are added to a frozen confection.

* * * * *